Oct. 29, 1940.     E. FISCHEL ET AL     2,220,055
COURSE INDICATOR FOR AIRCRAFT
Filed Oct. 25, 1937
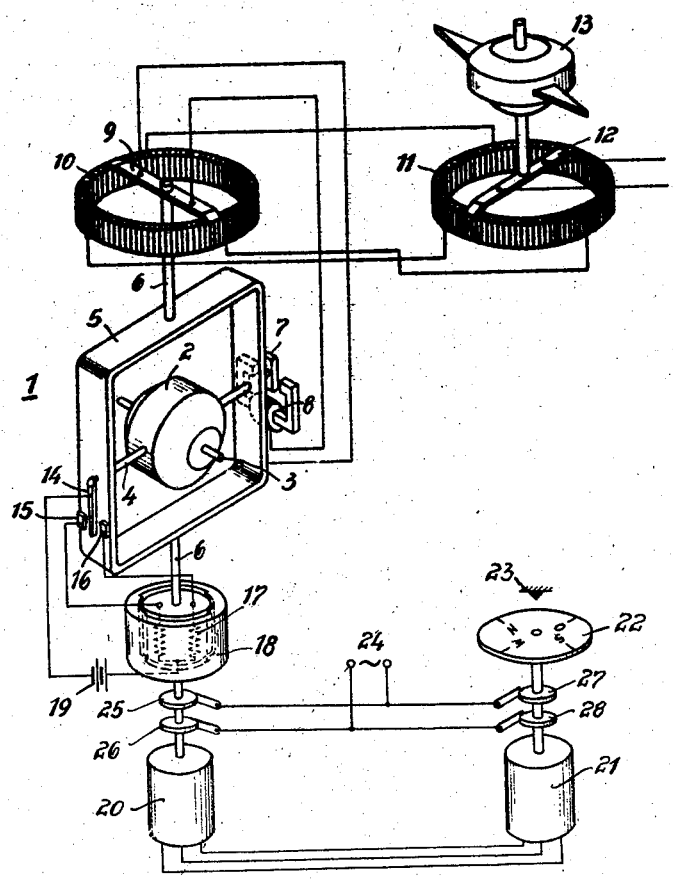
Inventors
*Eduard Fischell*
*Friedrich Lauck*
*Stephen Cerstvik*
        Attorney Patented Oct. 29, 1940

2,220,055

UNITED STATES PATENT OFFICE 2,220,055

COURSE INDICATOR FOR AIRCRAFT

Eduard Fischel, Berlin-Charlottenburg, and Friedrich Lauck, Berlin-Spandau, Germany, assignors to Siemens Apparate und Maschinen Gesellschaft mit beschränkter Haftung, Berlin, Germany, a corporation of Germany Application October 25, 1937, Serial No. 170,938
In Germany October 27, 1936

4 Claims. (Cl. 33—222)

This invention relates to a course indicator for aircraft, particularly for airplanes, consisting of a direction indicating device based on the utilization of the magnetic earth's field such as a magnetic compass, an earth inductor compass or the like, and of a course gyroscope controlled by the direction indicating device, which device controls the adjustment of the gyroscope axis, by means of auxiliary devices provided in the known manner and connected to the course gyroscope. The position of the course gyroscope is transmitted to auxiliary devices, such as a remote indicator, for instance, by means of rotating field systems whose transmitters are in direct driving connection with the axis of the course gyroscope, and preferably mounted on this axis.

In this arrangement and always in such cases in which a moment is to be taken from the axis of the course gyroscope it has been found in practice that a moment is exerted on the axis owing to the force necessary for the adjustment of the electric transmitting system. The object of the present invention is to remove this drawback by providing means which impart to the axis of the course gyroscope, an auxiliary force equal to the adjusting force necessary for the adjustment of the electric transmitting system so that the precession caused by transmission of power by the gyroscope to an indicating instrument, is compensated and an indication of high precision is obtained.

The invention will be now described by reference to the embodiment shown.

In the drawing, which illustrates schematically one embodiment of the invention, 1 denotes a course gyroscope whose gyro is driven in any suitable manner and is arranged in a casing 2. The casing 2 is supported in a Cardan ring 5 with the aid of a shaft 4 perpendicular to the horizontal rotating axis 3 of the gyro. The Cardan ring itself is carried by bearings fixed relatively to the airplane with the aid of a shaft 6 perpendicular to the shaft 4.

At one end of the precession axis 4 is mounted a permanent magnet 7 which is adapted to move within the precession inducing, magnetic field of coil 8 directly secured to the Cardan ring 5. The coil 8 is electrically connected to a double-armed contact 9 mounted on the upper free end of the axis 6, which contact 9 when moved over the ring resistance 10 influences the system transmitting the values of the righting moments of a direction indicating device. The latter is connected to a second ring resistance 11 by means of a three-wire bridge connection, on which ring resistance 11 a double-armed contact 12 is displaced in accordance with the position of a compass needle 13. The compass needle is made of such size and the resistance between arm 12 and ring 11 is made so small, which combined with the vibration of the needle further reduces the friction, so that needle 13 can control the position of contact 12.

On the other end of the precession axis 4 is mounted a contact arm 14 which upon the movement of the gyro about the axis 4 slides over the contact plates 15 and 16. The contact arm 14 and the contact plates are electrically connected to a winding 17 of a moment producing device 18, the winding 17 being firmly secured to the axis 6. A battery 19 serves to supply the current.

On the lower end of the axis 6 is mounted a transmitter 20 of an electric transmitting system of the well known self-synchronous type including pairs of transmitting and receiving rotors and stators whose receiver 21 adjusts a compass card 22 with respect to a fixed mark 23. A rotating field system, comprising field windings forming a rotor are mounted on the respective shafts located within the stators of the transmitter and the receiver, respectively, and thereby comprise the transmitting system. The field windings of the transmitter and of the receiver are energized by a power source 24 through slip rings 25, 26 and 27, 28 respectively.

The operation of the above-described arrangement is as follows: Owing to a relative departure of the position of the axis 6 from the position of the compass needle 13 the electric balance is disturbed in the transmitting system between the direction indicating device and the course gyroscope. A differential current begins to flow in the zero branch of the bridge and exerts a static moment on the precession axis 4 with the aid of the coil 8 and the armature 7, which causes a rotation of the course gyroscope 1 about its axis 6. This moment is exerted until the position of the axis coincides with that of the compass needle. At the same time the transmitter 20 is adjusted by the axis 6, the transmitter 20 adjusting in turn the receiver 21 and therefore the compass card 22. When the power required to move the field of transmitter 20 is taken from the gyroscope, a moment is exerted on the axis, which causes a precession of the gyro about its horizontal precession axis 4. The contact arm 14 mounted on this axis moves over the contact plate 15 or 16 depending upon in which direction of rotation the moment acts on the axis, to produce a current flow through winding 17 whereby the moment producing device 18 is caused to operate. The latter imparts to the axis 6 a moment which is equal and opposite to the moment caused when power is taken from the gyroscope. In the embodiment shown a rotary magnet is employed as a moment producing device. Instead of the latter also any suitable moment producing device, for instance, a direct-current or three-phase current motor may be employed, whose rotating part is in driving connection with the axis 6, preferably mounted thereon. The control of the direct-current or three-phase current motor is also effected by the movements of the gyro about its horizontal precession axis. The contact device employed in the embodiment shown for determining the magnitude of these movements may be readily replaced by any suitable contact device, for instance, by a bolometer such as shown in the U. S. Patent to Sell, 1,944,721 of January 23, 1934.

Preferably the choice of the moment producing device is made conditional upon the type of the power source employed for the drive of the gyroscope. Thus, for instance, also a three-phase current motor will be chosen as a moment producing device in the case of a three-phase current gyroscope. In this case, the current may be supplied to the moment producing device through the axis with the aid of the electric conductors arranged on the Cardan frame for the operation of the gyroscope. This has the great advantage over a special current supply from the outside in that the slip rings necessary therefor are dispensed with. It is understood that this current supply may be also employed for the electric transmitting system.

Although only one embodiment of the invention has been illustrated and described in detail, it is to be expressly understood that the same is not limited thereto. For example, in the form shown, the direction indicator is a magnetic compass; however, this may be replaced by other forms of compasses such for example as a gyro compass and the self-synchronous transmission system attached to the gyro shaft may be replaced by any suitable apparatus for repeating and further amplifying the movements of said shaft. Various changes may also be made in the design and arrangement of parts illustrated, as will now appear to those skilled in the art, without departing from the spirit and scope of the invention. For a definition of the limits of the invention reference will primarily be had to the appended claims.

What is claimed is:

1. In a course-indicating device, a neutral, three-degree-of-freedom directional gyroscope, a compass, means responsive to departure of said gyroscope and compass from a predetermined azimuthal relation for applying a torque to said gyroscope causing the same to precess in azimuth and restore said relation, a remote indicator, transmission means controlled by said precession and actuating said indicator, said transmission means, when operated, inherently applying a reaction to said gyroscope and causing secondary precession of said gyroscope about the axis of said torque, and power means controlled by said secondary precession for influencing said transmission means to nullify said reaction.

2. In a course-indicating device, a neutral, three-degree-of-freedom gyroscope, a directional indicator, means responsive to a departure of said gyroscope and direction indicator from a predetermined azimuthal relation for applying a torque to said gyroscope causing the same to precess in azimuth and restore said relation, a remote indicator, transmission means controlled by said precession and actuating said indicator, said transmission means, when operated, inherently applying a reaction to said gyro, and means controlled by said reaction for producing a force whose effect is equal and opposite to that of said reaction to thereby eliminate the effect thereof.

3. In a course-indicating device, a neutral, three-degree-of-freedom directional gyroscope mounted on a vertical shaft, a compass, means responsive to departure of said gyroscope and compass from a predetermined azimuthal relation for applying a torque to said gyroscope causing the same precess in azimuth and restore said relation, a remote indicator, a self-synchronous transmission system controlled by said precession and actuating said indicator, said system comprising a rotor attached to the shaft of said gyro and a stator electrically associated with said rotor, said rotor applying a reaction to said gyro when motion thereof modifies the electrical balance in said stator, said reaction causing a secondary precession of said gyro about the axis of said torque and power means controlled by said secondary precession for influencing said transmission means to nullify said reaction.

4. In a course-indicating device, a neutral, three-degree-of-freedom directional gyro mounted on a vertical shaft, a compass, means responsive to departure of said gyro and compass from a predetermined azimuthal relation for applying a torque to said gyro causing the same to precess in azimuth and restore said relation, a remote indicator, a self-synchronous transmission system controlled by said precession and actuating said indicator, said system comprising a rotor attached to said shaft and a stator in inductive relation with said rotor, said rotor applying a reaction to said gyro when motion thereof modifies the electrical balance in said stator, and power means controlled by said gyro applying a force annulling said reaction.

EDUARD FISCHEL.
FRIEDRICH LAUCK.